(12) United States Patent
Shinar

(10) Patent No.: US 9,860,360 B2
(45) Date of Patent: Jan. 2, 2018

(54) SYSTEM, DEVICE, AND METHOD OF WIRELESSLY CONTROLLING ELECTRONIC DEVICES AND APPLIANCES

(71) Applicant: OLIBRA LLC, Cresskill, NJ (US)

(72) Inventor: Zohar Shinar, Demarest, NJ (US)

(73) Assignee: OLIBRA LLC, Cresskill, NJ (US)

( * ) Notice: Subject to any disclaimer, the term of this patent is extended or adjusted under 35 U.S.C. 154(b) by 0 days.

(21) Appl. No.: 15/347,162

(22) Filed: Nov. 9, 2016

(65) Prior Publication Data

US 2017/0142249 A1 May 18, 2017

Related U.S. Application Data

(60) Provisional application No. 62/256,677, filed on Nov. 17, 2015, provisional application No. 62/339,793, filed on May 20, 2016.

(51) Int. Cl.
*H04W 4/00* (2009.01)
*H04M 1/725* (2006.01)
*H04L 12/28* (2006.01)

(52) U.S. Cl.
CPC .... *H04M 1/72533* (2013.01); *H04L 12/2834* (2013.01)

(58) Field of Classification Search
CPC .......... H04M 1/72533; H04L 12/2834; H04W 4/008

USPC ... 455/41.1, 41.2, 41.3, 550.1, 562.1, 575.1, 455/90.3
See application file for complete search history.

(56) References Cited

U.S. PATENT DOCUMENTS

| 2016/0134932 A1* | 5/2016 | Karp | H04N 21/4431 348/155 |
| 2016/0139575 A1* | 5/2016 | Funes | H04L 12/2834 700/275 |
| 2016/0197772 A1* | 7/2016 | Britt | H04L 41/0803 370/254 |

* cited by examiner

*Primary Examiner* — Ping Hsieh
(74) *Attorney, Agent, or Firm* — Eitan, Mehulal & Sadot

(57) ABSTRACT

Devices, systems, and methods of wirelessly controlling appliances and electronic devices, such as ceiling fans, air conditioners, garage doors, or the like. A receive-only ceiling fan is wirelessly controlled by a proprietary remote control unit. A cloning unit is able to clone or duplicate the proprietary wireless signal, and to replay it or re-generate it in response to a triggering command that a user submitted via a smartphone or tablet; thereby enabling to control such appliances via mobile electronic devices. The cloning unit utilizes recording of the wireless signal payload and carrier frequency; wireless signal analysis; image analysis of the appliance or of the remote control unit; queries to a remote server to obtain properties of the proprietary wireless signal; or other techniques of signal analysis or duplication.

3 Claims, 4 Drawing Sheets

SYSTEM, DEVICE, AND METHOD OF WIRELESSLY CONTROLLING ELECTRONIC DEVICES AND APPLIANCES

CROSS-REFERENCE TO RELATED APPLICATIONS

This patent application claims priority and benefit from U.S. provisional patent application No. 62/256,677, filed on Nov. 17, 2015, which is hereby incorporated by reference in its entirety.

This patent application also claims priority and benefit from U.S. provisional patent application No. 62/339,793, filed on May 20, 2016, which is hereby incorporated by reference in its entirety.

FIELD

The present invention is related to the field of electronic devices and home appliances.

BACKGROUND

Millions of people around the world utilize mobile electronic devices, such as smartphones and tablets, in order to perform various activities. Such activities include, for example, browsing the Internet, sending and receiving electronic mail (email) messages, taking photographs and videos, engaging in a video conference, playing games, or the like.

Millions of households include various appliances and electric devices, for example, a fridge, a freezer, a microwave oven, a ceiling fan, an air conditioning unit, or the like. Such devices and their operational features are typically controlled via manual pressing of keys or buttons that are located on the appliance, for example, a numeric keypad of a microwave oven, or a manual interface that allows a user to modify the temperature settings of a fridge.

SUMMARY

Embodiments of the present invention comprise devices, systems, and methods of wirelessly controlling various appliances and electric devices, particularly via a smartphone or tablet.

For example, a receive-only ceiling fan is wirelessly controlled by a proprietary remote control unit. A cloning unit is able to clone or duplicate the proprietary wireless signal, and to replay it or re-generate it in response to a triggering command that a user submitted via a smartphone or tablet; thereby enabling to control such appliances via mobile electronic devices. The cloning unit utilizes recording of the wireless signal payload and carrier frequency; wireless signal analysis; image analysis of the appliance or of the remote control unit; queries to a remote server to obtain properties of the proprietary wireless signal; or other techniques of signal analysis or duplication.

Some embodiments may provide other and/or additional benefits and/or advantages.

DESCRIPTION OF SOME DEMONSTRATIVE EMBODIMENTS

Figure 1:
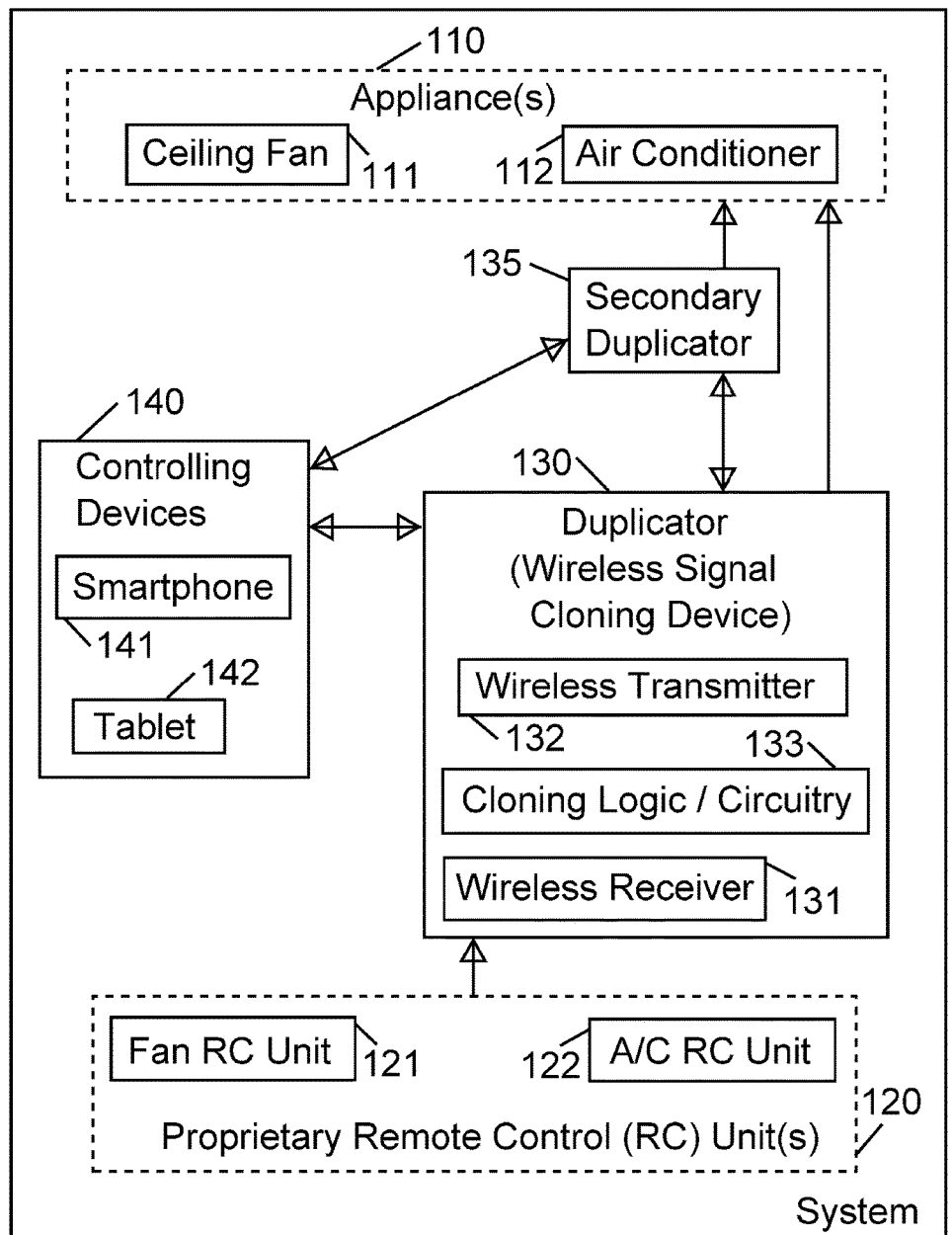
FIG. 1 is a schematic block-diagram illustration of a system, in accordance with some demonstrative embodiments of the present invention.

The Applicant has realized that many households, as well as offices and other venues, already include various appliances that are controlled only manually, or are controlled via a dedicated, proprietary, Radio Frequency (RF) and/or Infra-Red (IR) remote control unit; and such devices lack the ability to be controlled wirelessly over wireless Radio Frequency (RF) signal(s) that a smartphone or a tablet may be able to wirelessly transmit.

The Applicant has realized that such legacy appliances may require a hardware-based modification, in order to make such legacy appliances to be able to receive RF signals from a non-proprietary Remote Control (RC) unit or from other electronic devices, and/or to be wirelessly controlled via a portable device that comprises an RF transmitter (such as, smartphone or tablet).

The Applicant has further realized that an IR remote control unit of many such appliances, may have a limited range; and/or may require a clear line-of-sight between the IR remote control unit and the controlled appliance; and/or may not operate when the IR control unit is located in a first room whereas the appliance is located in another room.

In accordance with some demonstrative embodiments of the present invention, a "listener" device may be provided to an already-existing venue. The listener device may be battery operated, and/or may be connected to an electric wall outlet. The listener device may listen to, or may capture, an RF or Infra-Red signal (or other wireless signal) that is transmitted by an appliance Remote Control (RC) unit towards an appliance; and may capture, record and/or analyze the signal (including the signal's payload and/or the signal's carrier); and may be able to transmit a duplicate signal, or a sufficiently-similar signal, in order to control the appliance. The listener device may transmit such wireless commands to the appliance, in response to receiving an RF signal from a smartphone or tablet; and/or in response to receiving, via Wi-Fi or other wireless communication protocol, a message (e.g., a TCP/IP message) indicating that a user that operates such smartphone or tablet desires that the command be transmitted to the appliance. Accordingly, some embodiments may enable a user to control appliances, via a smartphone or a tablet, or via other suitable devices, such as smart-watch or fitness-watch, an Augmented Reality (AR) helmet or head-gear or glasses or equipment, a Virtual Reality (VR) helmet or head-gear or glasses or equipment, a gaming device, or the like.

The present invention may provide a custom "App" (e.g., application for smartphone, tablet, or other mobile device or electronic device) enabling a user to record and play-back any wireless remote control signal, including but not limited to a Radio Frequency (RF) remote control signal, an Infra-Red (RF) remote control signal, and/or other suitable wireless control signals that may be used by various types of "remote control" units that are typically used for controlling various devices and/or appliances, e.g., a ceiling fan; a desk fan; a floor fan; a window fan; an air conditioning unit to system; a heating unit or system; a cooling system or unit;

an HVAC system or unit; a garage door, or a garage door opener, or a garage door unit or system; a fire-place; a light-bulb; a light fixture, lamp, chandelier, or other illumination units; a kitchen appliance; a hot tub or a spa system or a Jacuzzi unit or system; an indoor or an outdoor swimming pool; a heating unit of a swimming pool or of a hot tub; a system that produces or that modifies one or more features of a swimming pool or of a hot tub (e.g., water temperature, heating level, salt level, chlorine level); a system that controls one or more features of a bathtub or a shower or a bathroom system; or the like.

The present invention may further provide a unique combination of: (a) App-based wireless control of a device, and (b) web-based or Internet database, and (c) the ability to achieve full RF recording.

In a demonstrative embodiment of the present invention, an RF receiver is scanning frequency bands in high resolution, and identifies the carrier frequency of the remote control signal that is being recorded or that is intended to be recorded.

Reference is made to FIG. 1, which is a schematic block-diagram illustration of a system 100, in accordance with some demonstrative embodiments of the present invention.

System 100 may comprise one or more appliances 110 or electric devices that are capable of being controlled wirelessly; for example, a ceiling fan 111, and an air conditioner 112. Optionally, each such appliance 110 may comprise a wireless receiver, for example, a wireless RF receiver; and optionally one or more antennas.

System 100 may further comprise one or more conventional or manufacturer-original or proprietary wireless Remote Control (RC) units 120, that are able to wirelessly control the appliance(s) 110, by wirelessly transmitting a particular pre-defined wireless RF signal (e.g., in response to a user command, when the user operates the remote control unit). For example, a dedicated or proprietary fan RC unit 121 may control the ceiling fan 111; and a dedicated or proprietary air conditioner RC unit 122 may control the air conditioner 112.

System 100 may further comprise a Duplicator 130, which may be a cloning unit able to "listen" to, or able to monitor, receive and/or record, a wireless RF signal that is being transmitted by the conventional RF remote control unit towards the appliance. Cloning Logic/Circuitry 133 may be able to store, analyze, replicate, duplicate, emulate, simulate, generate and/or re-construct, at a different time (e.g., subsequently, when the conventional RF remote control unit is not operational or is absent from the venue) a similar or a sufficiently-similar or an identical RF wireless signal that is transmitted to the appliance and that triggers the appliance to operate or to modify its operational properties in response to such signal. The Duplicator 130 may further be referred to as a "listener" unit, or as a "cloning unit" or a "cloning device".

The Duplicator 130 may comprise a wireless receiver 131, able to receive a triggering signal directly or indirectly from one or more controlling devices 140, for example, a smartphone 141 or a tablet 142. The triggering signal may be transmitted wirelessly from the controlling device 140 to the Duplicator 130, directly over a local Wi-Fi link, or directly over a local IR link, or directly over a local Bluetooth link, or directly over a local ZigBee link, or indirectly via a router or a routing network or via the Internet or TCP/IP communication (e.g., the controlling device 140 may wirelessly send or upload, to a remote server, a signal indicating a command directed to the appliance 110; and the remote server may then transmit to the Duplicator 130 a signal indicating that the command was received at the remote signal, and further identifying which command it is).

Upon wirelessly receiving such triggering signal at the wireless receiver 131 of the Duplicator 130, a wireless transmitter 132 of the Duplicator 130 may transmit towards the appliance 110 a suitable wireless signal (e.g., IR signal, RF signal, ZigBee signal, Bluetooth signal, or the like), that indicates a command to modify an operational property of the appliance 110.

Optionally, in addition to a Primary duplicator unit (e.g., Duplicator 130), one or more additional units may be utilized in a single venue (or in multiple venues), for example, located in different rooms of a same house (or office), or located in different floors of a same house (or office), or the like. Optionally, a primary duplicator unit may receive power from a wall-based electric outlet; whereas a secondary duplicator unit may receive power from a similar wall-based electric outlet and/or from an internal battery. For demonstrative purposes, a secondary duplicator 135 is shown, e.g., a "Pico" unit, optionally operating as a signal repeater and translator (or converter) from RF signal to IR signal and/or from IR signal to RF signal (e.g., operating as a bridge unit or an intermediary converter unit), signal range extender, signal amplifier, signal re-broadcaster, signal re-transmitter, and/or signal relay unit, to extend or relay or re-transmit or amplify the original signal that is originally transmitted or originally generated or originally analyzed by the primary duplicator 130. In some embodiments, optionally, the primary duplicator 130 may capture and may analyze wireless signals that control the ceiling fan; and may transmit to the secondary duplicator 135 data enabling such secondary duplicator to autonomously re-generate or transmit a suitable wireless signal to command the operational properties of the ceiling fan; without necessarily having analysis units in the secondary duplicator 135, thereby enabling lower cost, smaller form factor, and battery-based operation of such secondary duplicator 135 having a "thin" implementation compared to the primary duplicator 130.

Figure 2:
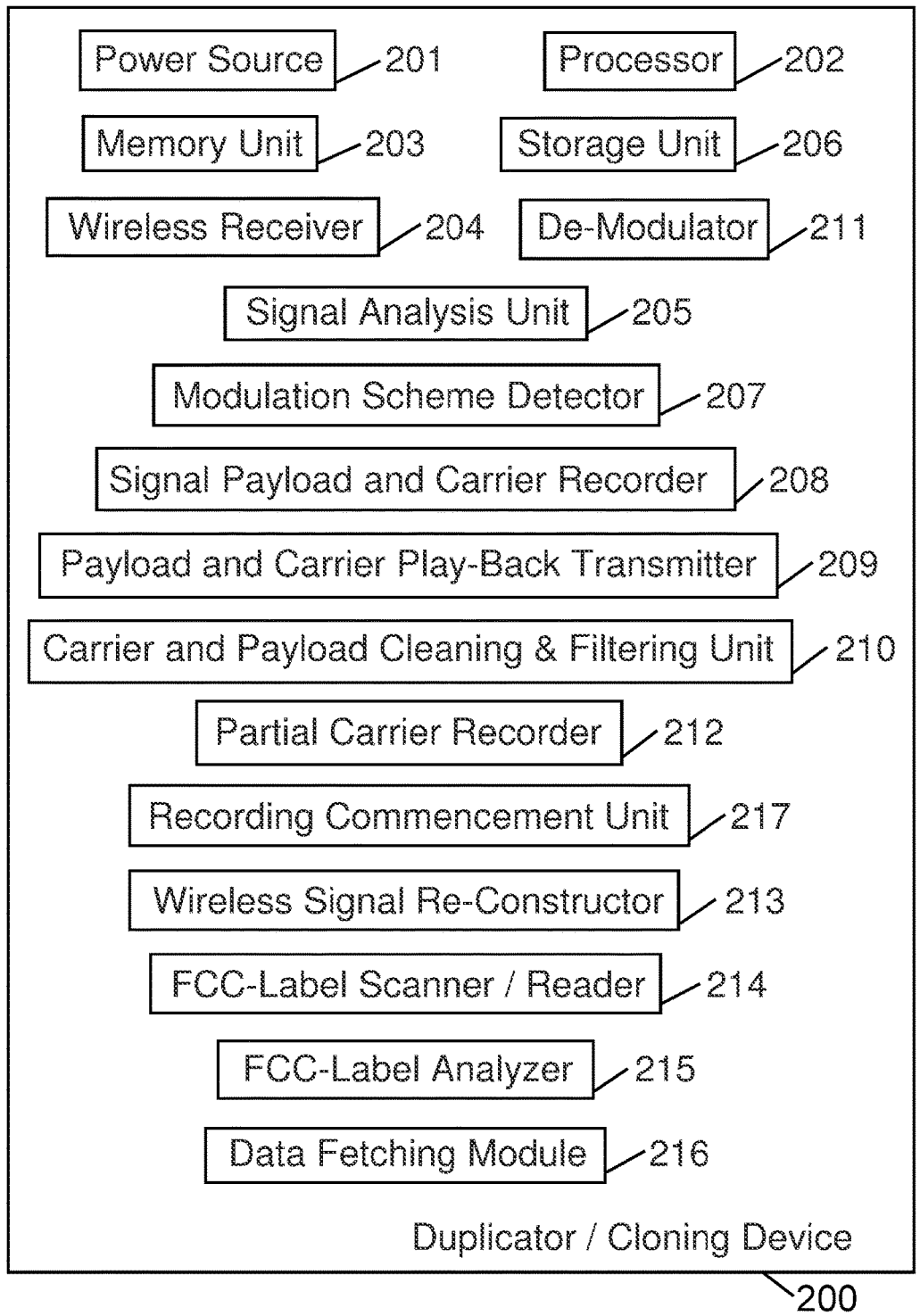
FIG. 2 is a schematic block-diagram illustration of a cloning device and wireless signal duplicator, in accordance with some demonstrative embodiments of the present invention.

Reference is also made to FIG. 2, which is a schematic block-diagram illustration of such "Duplicator" or a cloning device 200, in accordance with some demonstrative embodiments of the present invention. Cloning device 200 may comprise a power source 201 (e.g., internal battery; recharge-able battery; and/or connection to an electric power outlet), a processor 202, and a memory unit 203.

The user may use the App on his controlling device (e.g., smartphone, tablet) to interact with the cloning unit 200, and to notify the cloning unit 200 that a cloning/programming process is starting. The user may specify the type of appliance or device (e.g., air conditioning unit; ceiling fan) and/or the function that is being cloned (e.g., turn on; turn off; increase speed; decrease speed; increase temperature; decrease temperature), by selecting options from the App on the controlling device (e.g., via a drop-down menu interface, or by using a step-by-step wizard, or other user interface). It is noted that the terms "cloning" or "duplicating" as used herein, may include any suitable type of replicating or simulating or emulating of signals; re-generating signals from scratch, or reconstructing signals from scratch; recording and then re-broadcasting a signal, or a part of a signal; programming or re-programming a transmitter to generate or to transmit a signal based on extracted properties of another signal or based on other signal properties; performing conversion or translation of a first signal (e.g., an RF signal) to a second signal (e.g., an IR signal), or vice versa; a combination of the above (for example, partially re-transmitting a pre-recorded signal, and partially reconstructing a new signal or an additional signal based on analysis of signal properties); generating and/or transmitting of a compatible, or a sufficiently-compatible signal, that is able to cause similar or identical results to those obtained by transmission of the original signal; or the like.

Once the wireless RF signal is detected by a wireless receiver 204 of the cloning device, it may operate a Signal Analysis Unit 205 to analyze the signal in real time; and/or it may store the signal in a storage unit 206, and may perform near-real-time analysis of the stored signal, by the Signal Analysis Unit 205. For example, a Modulation Scheme Detector 207 may detect or identify the type of modulation scheme that is used by the RC unit of the appliance; and/or a Signal Payload and Carrier Recorder 208 may record and store the whole entire RF signal that the RC unit transmits towards the appliance, including its payload as well as its carrier frequency.

In some embodiments, in order to record the wireless signal, the cloning device may need to detect the modulation scheme of the wireless signal, its estimated bandwidth, and/or its central frequency (e.g., not necessarily its carrier frequency, since sometime there is no single carrier). Once the cloning device has sufficient confidence (e.g., relative to a pre-defined confidence threshold value) of the modulation of the signal, the signal is sampled using a Software Defined Radio (SDR) module or unit, comprising a down-converter and an Analog to Digital Converter (ADC). The ADC sampling rate is configured to be higher or much higher than the transmission bandwidth (e.g., the maximum bandwidth or the maximum typical bandwidth) of the proprietary remote control unit. The digital data is being stored in the memory unit of the cloning device on the fly, as it is being demodulated/converted to digital.

Optionally, a Recording Commencement Unit 217 may determine when or whether to start the recording of data captured as a wireless signal (payload, carrier frequency). For example, the listening wireless receiver of the cloning device may be listening to noise (or may observer demodulated noise) that appears to be data, due to ambient conditions or environmental conditions or interference; and one or more criteria may be used, taking into account the particular characteristics of the venue in which the particular cloning device is located (e.g., based on a spectrum survey) in order to set, modify, increase and/or decrease a threshold value that indicates that the demodulated signal is indeed a wireless communication signal that should be recorded, rather than signal-like noise that should be ignored and discarded without being recorded.

Optionally, a Recording Length Modifier 218 may dynamically set, modify, increase and/or decrease the length of the recording of the wireless signal (payload, frequency); for example, based on real-time or near-real-time analysis of the wireless signal that was recorded so far, and/or based on information that is already known about the type of device being controlled (e.g., a first type of Appliance typically requires recording of 3 seconds, whereas a second type of Appliance typically requires recording of 7 seconds). For example, the cloning device may have preset rules for minimum required recording time, maximum required recording time, average recording time, and/or other rules or threshold values based on the type of appliance whose RC unit is intended for cloning. Additionally or alternatively, the Recording Length Modifier 218 may take into account one or more identified patterns or already-known patterns of signals, or other already-known or already-configured information about structure of types of signals, enabling the cloning device to efficiently recognize a start of a signal, an end of a signal, preamble(s) of signals, trailing zeros or upfront codes that commence a signal, appendix of signal(s) or tailing code-words or tailing codes or appended codes or ending codes; thereby enabling the Recording Length Modifier 218 to ensure that the features or the content-portions of the wireless signal, that are important or required for suitable cloning, are indeed recorded. Optionally, during the recording, the cloning device may clean up (or partially discard) the beginning of the wireless signal, which may be cut in the middle; to avoid or to prevent a situation in which playback or transmission of the cloned signal would start with half-a-packet or half-a-frame or other incomplete portion of a packet or a frame, which may cause undesired or unknown behavior at the wireless receiver of the appliance intended to be remotely controlled.

The cloning device 200 may subsequently play-back the original, previously-recorded, wireless RF signal including its original previously-recorded carrier, without distortion and/or without any modification; via a Payload and Carrier Play-Back Transmitter 209, which may thus operate (or modify the operational properties of) the appliance in response to a triggering command received wirelessly from the controlling smartphone or tablet.

Additionally or alternatively, the cloning device 200 may subsequently play-back the original, previously-recorded, wireless RF signal including its original previously-recorded carrier, but after performing a cleaning process or noise-filtering process or other enhancement process, which may be performed by a Carrier and Payload Cleaning & Filtering Unit 210 of the cloning device 200.

Additionally or alternatively, the cloning device 200 may utilize a de-modulator 211 to demodulate the wireless signal captured by the wireless receiver 204 of the cloning device 200 (namely, the wireless signal that was transmitted by the RC unit of the appliance); and may record and store only the de-modulated signal (e.g., the data, the payload that is carried within the wireless signal), without necessarily recording also the entire RF carrier, or with a partial recording (and storing) of the RF carrier (e.g., recorded by a Partial Carrier Recorder 212 that may operate to record the RF carrier only for a pre-defined time-period, for example, 1 second or 3 seconds or K seconds); and may subsequently utilize a Wireless Signal Re-Constructor 213 to re-produce or re-generate or re-construct the RF carrier and re-compose the wireless signal and re-transmit it to the target appliance when required (e.g., upon a command transmitted wirelessly by a mobile device of the user, to the cloning device).

Some embodiments may utilize de-modulation and/or frequency domain analysis, and may determine the modulation scheme of the wireless signal based on the side bands and/or the configuration of the carrier frequency. For example, a sideband(s) detector may detect the sidebands; and detection of carrier frequency having two sidebands indicates that the modulation scheme is Amplitude-Shift Keying (ASK) or On-Off Keying (OOK).

Additionally or alternatively, the modulation scheme may be detected or estimated, or candidate modulation schemes may be eliminated, based on an elimination scheme or by using trial and error process. For example, instead of (or in addition to) analyzing the frequency domain features, the cloning device may utilize an OOK detector; and the coherency of the output of the OOK detector may indicate whether the wireless signal appears to be properly modulated data (or conversely, noise).

Additionally or alternatively, and particularly if the carrier frequency is not detected, the cloning device may switch to one or more forms of Frequency-Shift Keying (FSK) modulation, and may then check whether meaningful output is produced by the de-modulator unit.

Additionally or alternatively, determining the modulation scheme may take into account (or may be based on) user input which indicates the type of appliance that is being controlled or that is intended to be controlled via the cloning device, and/or taking into account one or more predefined rules or conditions, and/or utilizing a lookup table. For example, in some embodiments, the cloning device may be pre-configured such that if the user indicates that the appliance type is a "ceiling fan", then the modulation scheme is OOK or ASK (and optionally, measurement of average RSSI may enable to confirm OOK/ASK modulation, and/or to distinguish between OOK and ASK). In contrast, if the user indicates that the appliance type is "garage door opener", then the modulation scheme is FSK. Accordingly, user input with regard to the type of the appliance, may be used by the system for eliminating modulation schemes and/or for narrowing-in on the suitable modulation scheme and/or for increasing the level of confidence of the system in an estimated modulation scheme.

Additionally or alternatively, the cloning device may detect or estimate the modulation scheme based on the Carrier Detection Frequency (not to be confused with the Carrier Frequency). For example, if the cloning device is scanning the spectrum or is listening to wireless signals in order to detect properties of a proprietary RC unit of a ceiling fan, and finds multiple frequencies, then this may indicate that a Spread Spectrum modulation (or Frequency Modulation (FM scheme) is used; thereby eliminating OOK and ASK modulation, and thereby switching to (and narrowing down the search to) FSK modulation schemes.

Some embodiments of the present invention may collect and/or analyze and/or parse FCC-data, obtained from a Federal Communications Commission (FCC) repository or website, and/or from a repository or website of a manufacturer of the appliance, and/or from a repository or website of a vendor or merchant that sells the appliance, and/or from other public sources and/or proprietary sources (e.g., from a privately-owned database); for example, based on the data that is included in the FCC marking or label that may be printed on or affixed to the conventional remote control.

In a demonstrative example, the appliance may be a wireless ceiling fan; and may be associated with a proprietary wireless RF remote control unit able to control the ceiling fan through a non-IR, radio frequency signal. The conventional RC unit, and/or the appliance itself, and/or a packaging or a manual or a specification-sheet thereof, or a website or database of the FCC or the manufacturer or the vendor, may include a label or a printing or data that associates between the actual appliance (e.g., "Ceiling Fan model 2015-B") with a particular FCC license or approval or file number or FCC registration number (FRN) or FCC identification number (FIN) of FCC identification number (FCC-ID or FCCID) (for example, "FCC ID 987654"). The system of the present invention may scan such information (e.g., by asking the user to take a photo of the conventional remote control and/or the appliance and/or their label and/or their manual), or may obtain it from the user (e.g., by asking the user to type or to provide the FCC number that the user sees on his appliance or remote control), or may otherwise obtain the FCC number; and the system may proceed to autonomously fetch, download or obtain the full or the partial FCC record or FCC file, and may parse or analyze the obtained data to uncover the carrier frequency or other RF characteristics that may be used for re-constructing a cloned RF signal. These operations may be performed via an FCC-Label Scanner/Reader 214, able to scan or read or image such FCC-data label; and/or via an FCC-Label Analyzer 215, able to perform Optical Character Recognition (OCR) on the acquired label image; and/or via a Data Fetching Module 216 able to query one or more databases or websites, and able to download or receive from such website(s), the information corresponding to such appliance identified by the FCC label, and particularly data about the wireless signal (e.g., frequency, carrier frequency) that may then be utilized in order to generate or to reconstruct a compatible wireless signal for wirelessly controlling such appliance.

In another embodiment, the user may utilize the controlling device (e.g., smartphone, tablet) in order to manually enter (e.g., by typing, by speech or voice input) the FCC data or FCC identifier, which may then be used for fetching or obtaining additional data that is used for re-generation of a compatible wireless signal that controls the appliance. Optionally, a speech-to-text converter or module may be used to enable such voice-based entry of data by the user.

In another embodiment, the user may utilize the controlling device (e.g., smartphone, tablet) in order to manually answer questions (e.g., by typing, or by voice or speech) that enable the system to identify the make and model of the appliance to be controlled. For example, the user may firstly be asked by the App on his smartphone, "is this a Ceiling Fan or an Air Conditioner?" and may provide his response ("Ceiling Fan"); the user is then asked "is the brand of this ceiling fan Adamson Fans, or Barbara Fans, or Charles Fans?", and the user then selects the relevant make ("Barbara Fans"); then, the user is asked "is this a three-blade fan or a four-blade fan?"; then, the user is asked "does your original Remote Control unit have three buttons or four buttons?"; and so forth, thereby enabling the system to pin-point the particular model of appliance that is intended to be controlled wirelessly.

The system may support these modes of operation, which may rely (in whole, or in part) on some type of data entry by the user, in case the detection of the RF signal cannot be done correctly (e.g., due to interferences, or due to a weak transmitter of the conventional RC unit, or even due to the absence (e.g., loss) of the original RC unit). For example, the user may enter through the App, the FCC code that is shown on the back of his conventional remote control unit or appliance. The App may automatically search the web or the Internet or other sources for the carrier frequency and modulation type that is used by this remote control or by this appliance; and this information may be used by the cloning device to re-construct or to generate, subsequently, a cloned wireless RF signal to wirelessly control the appliance.

The system may optionally have an API that may enable integration to any suitable Home Automation platform or system or dashboard; and/or may allow third-party developers to provide further interactions and/or functionalities to the device(s) of the system.

Figure 3A:
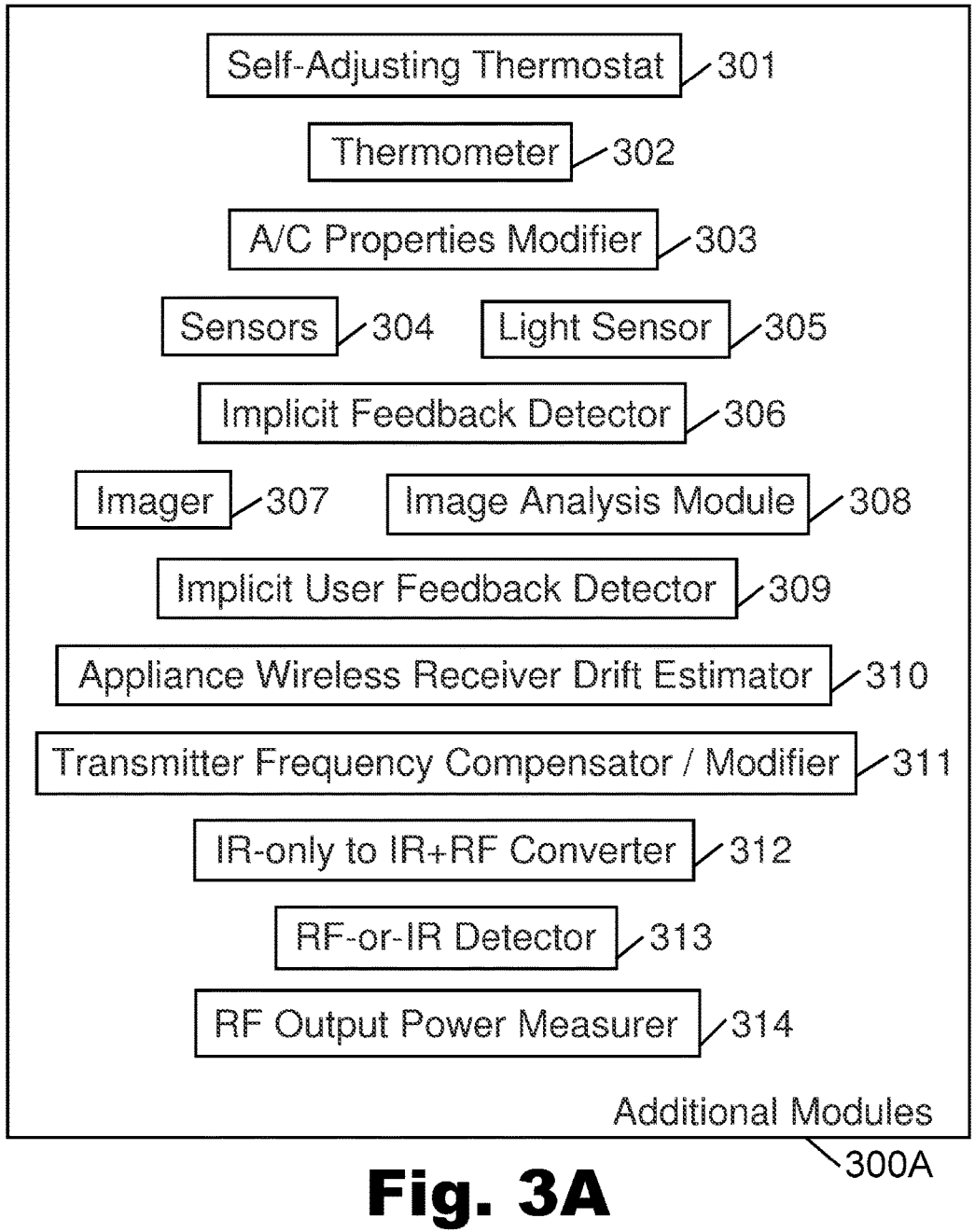
FIGS. 3A and 3B are schematic block-diagram illustrations of additional modules of the system, in accordance with some demonstrative embodiments of the invention.
Figure 3B:
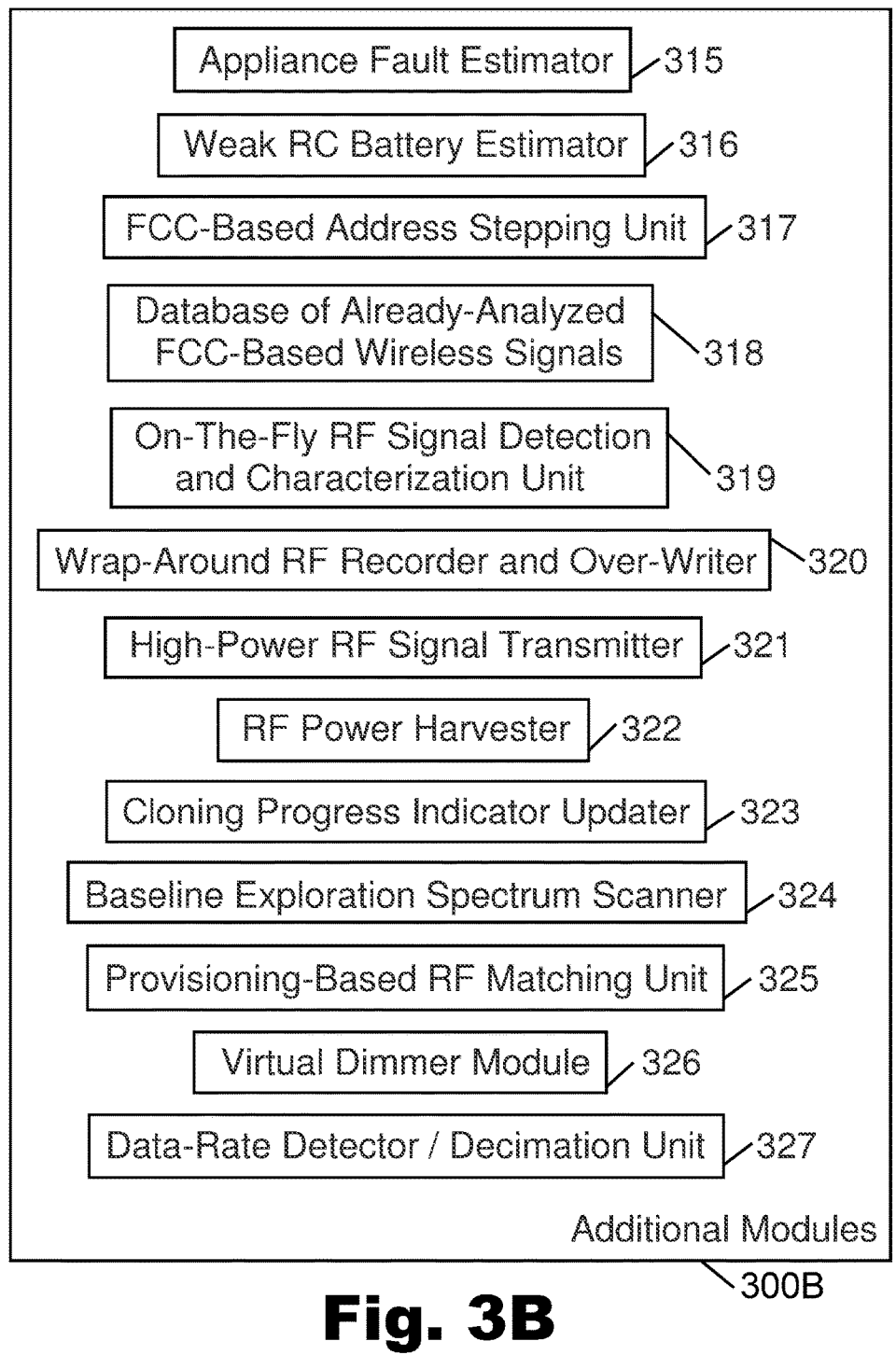

FIGS. 3A and 3B are schematic block-diagram illustrations of Additional Modules 300A and 300B, respectively, in accordance with some demonstrative embodiments of the invention. One or more, or some, or all, of the Additional Modules 300A and/or 300B may be comprised in system 100 of FIG. 1, and/or in one or more of the devices of system 100, and/or in the Cloning Device 200 of FIG. 2.

Optionally, the system may comprise a wind-chill self-adjusting thermostat 301. For example, the system may use its knowledge of the ceiling fan status, and may combine or fuse such information with the A/C temperature setting and/or the actual room temperature (e.g., as sensed by a sensor or thermometer of the system). A conventional ceiling fan has one-way radio communication (namely, receive-only to receive an incoming signal indicating a command, and no transmit); and therefore its status and wind generation is generally unknown to conventional systems. In contrast, the system of the present invention may utilize a thermometer 302 which may be provided within the fan and/or may be mounted on or near the fan (e.g., as an accessory), and may be a Wi-Fi enabled thermometer, or a thermometer that may be read remotely; such that a Wi-Fi enabled controller of a nearby A/C unit may be controlled by the system of the present invention, thereby reducing its temperature to achieve the same effect of lower temperature on the users.

The system may thus enable to "bridge the gap" between a conventional Ceiling Fan, that does not provide or transmit output about its operation; and an A/C unit that may take into account the current and/or the past operational properties of the ceiling fan in order to adjust the A/C operational properties. Accordingly, the system save energy consumption and may reduce costs to the end-user, by detecting that the ceiling fan is operational, and in response, sending a wireless signal or other command to an A/C unit or system, commanding such A/C unit or system to reduce its operational effort, or to go into power-saving mode, or to increase by one degree (or by N degrees) its target temperature that is intended to be reached or to be held. Additionally or alternatively, for example, the system may detect that the ceiling fan is non-operational, and in response, may send a wireless signal or other command to an A/C unit or system, commanding such A/C unit or system to increase its operational effort, or to exit from power-saving mode or from standby mode, or to decrease by one degree (or by N degrees) its target temperature that is intended to be reached or to be held. Such operations may be performed by an Air Conditioner Properties Modifier 303, based on the operational status and/or the operational properties of the ceiling fan; and such data may optionally be determined and/or provided by the Duplicator or the Cloning Device, which may determine the current status of the ceiling fan since, for example, the Duplicator or the Cloning Device had recently transmitted a command to the ceiling fan (e.g., an activation command, a de-activation command, a command to modify speed or other operational property).

The present invention may utilize one or more sensors in order to improve one-way radio communication among multiple devices or appliances (e.g., in a home, or office, or other venue).

The Applicant has realized that in a conventional system, devices may be communicating by using one-way radio communication; for example, a ceiling fan is able only to receive a command signal. Therefore, there is no way for the system (or to a component in the system) to know if a command was actually received and/or correctly executed by the Ceiling Fan; as there is no "ACK" or "NACK" response transmitted by the ceiling fan, or received from the ceiling fan.

The system of the present invention may use multiple sensors 304 (e.g., a light sensor 305) to complement or to supplement or to improve the one-way radio communication, and/or to provide indication with regard to whether a transmitted wireless command was indeed received by the intended device and/or acted-upon by the intended device or appliance.

For example, if a ceiling fan command to turn on the light was wirelessly sent, by a dedicated RC unit of the ceiling fan or by another controlling device (e.g., smartphone or tablet, aided by the Cloning Device), then an ambience sensor or light sensor may measure or may sense the light in the room before and after the command was wirelessly sent to the ceiling fan; if the light level did not change at all, or did not change by at least a pre-defined threshold value (e.g., did not increase by at least 10% or K percent of lumens), then the system may determine that the command was not correctly received by the ceiling fan, and may operate to re-send the wireless command (e.g., at least K additional times, with time intervals of N milliseconds) until the system senses that the light turns on; or until a threshold number of failed attempts is reached. This mechanism may be implemented by using an Implicit Feedback Detector 306, which may be comprised in the cloning device 200, and which may deduce or may determine, indirectly, feedback with regard to whether or not a wireless command was indeed received and/or executed, without receiving direct ACK or NACK or other direct feedback from the commanded device, but rather, based on external measurement or sensing of changes to the environment.

In another example, an imager 307 or camera may be used by the cloning device, in order to acquire images or video of the ceiling fan; and an Image Analysis Module 308 may analyze such images or video in order to determine, for example, whether a wirelessly-transmitted "turn on" command was indeed received and executed (e.g., by detecting that the blades of the ceiling fan are displaced across multiple images); or whether a wirelessly-transmitted "turn off" command was indeed received and executed (e.g., by detecting that previously-moving blades of the fan are slowing down or have stopped spinning), or whether a wirelessly-transmitted command that modifies the speed of rotation was indeed received and executed (e.g., by estimating the spinning speed, based on the location of fan blades across multiple images, as a function of time).

In some embodiments, the user may capture an image (or a set of images, from various angles) of the Ceiling Fan (or other appliance); and the Image Analysis Module 308 may analyze the image using computer vision or by using "big data" mechanism (e.g., comparison to a database of Ceiling Fan images) in order to determine, based on the image(s) of the ceiling fan, the make and/or the model of the ceiling fan. For example, some ceiling fans may have particularly unique shape of blades (e.g., blades shaped as leaves of a palm tree), or blade decorations, or other unique structure, that may enable immediate detection and determination of such data based on image(s) alone; for example, a Twin Fan ceiling fan in which two fans are rotating perpendicularly to the ceiling and are interconnected via a horizontal rod that is parallel to the ceiling, instead of a regular stand-alone ceiling fan which rotates within a plane that is generally parallel to the ceiling. Once the make and model of the ceiling fan is determined via such captured image(s), a lookup table or owner's manual or technical specification of the ceiling fan may be utilized to extract additional information, support data, FCC identifier, and/or other parameters, which in turn may enable the system to fetch or to deduce the properties that are required for cloning or for re-generating the wireless signal that controls such fan.

In another embodiment, for example, the Appliance (e.g., not necessarily a ceiling fan; such as an air conditioner, or a garage door opener) may have thereon a sticker or a decal or an embossing that shows the make and/or model information, which can be extracted via computer vision algorithms from image(s) of the appliance.

In yet another embodiment, the Appliance may have a unique 2-D or 3-D design or structure or features (e.g., particular colors, or particular rods or pins or protrusions or cavities), which may allow a computer vision algorithm or a search-by-image algorithm to determine the make and model based on such imaged features.

In still another embodiment, the user may capture (e.g., via his smartphone or tablet) an image or a set of images of the proprietary (original) RC unit of the appliance; and may send or upload such image(s) to the cloning device and/or to a remote server; which, in turn, may utilize computer vision algorithms and/or image comparison and/or search-by-image algorithms in order to identify the particular RC unit and/or the particular appliance that is controlled via that RC unit. For example, an image of a proprietary RC unit may show a sticker or a label or an embossing of "Texas Fans, Model 1506", and image analysis may extract such make and mode numbers and may utilize them for fetching the required properties for constructing a compatible wireless signal. In another example, an image of a proprietary RC unit may show a distinct feature of that RC unit; such as, that the Speed Up/Speed Down buttons are shaped as two red triangles, and are located to the left side of a diamond-shaped On/Off button; and this unique structure of the RC unit, once imaged and acquired, may enable the system (via computer vision and/or image comparison) to determine which make and model are the proprietary RC unit and/or the appliance that it controls.

The system may further provide automated transmitter and receiver channel optimization. Based on the system's using of multiple sensors 304 to complement a one-way radio communication channel, the system of the present invention may be able, over time, to improve the wireless communication channel by incrementally moving the carrier frequency and measuring the response by the sensors or the user.

For example, if a wireless command was sent (e.g., was transmitted as a wireless RF signal from the cloning device to the ceiling fan), and the user keeps re-commanding it again and again (e.g., the user keeps commanding, via his smartphone, to turn on the appliance or the ceiling fan), then the system may determine that this is indication there are interactions and/or interference in the communication channel, and that the wireless command was not properly received and/or executed; and the cloning device may optionally, from time to time, step-up or step-down or modify the transmission frequency (e.g., the carrier frequency of the cloned or re-constructed RF signal) to a slightly-modified frequency in which the occurrence of a "missed command" (or a command that is not acted upon) is minimal. Accordingly, repeated requests by a user to perform a particular command (e.g., "turn off ceiling fan") via his controlling device (e.g., an App on his smartphone or tablet), may be used by the cloning device to determine that the wireless signal was not properly received and/or executed, and for modifying one or more properties of the wireless signal that is then re-transmitted to the ceiling fan (e.g., for at least N additional attempts). This mechanism may optionally be implemented by an Implicit User Feedback Detector 309, which may be comprised in cloning device 200.

The present invention may provide automated transmitter and receiver channel optimization, to compensate for temperature or other environmental conditions. For example, the cloning device may record some or all of the captured RF activity (e.g., including RF carrier and the data payload itself) when an appliance (e.g., ceiling fan) is turned on, and may continue to collect data on "missed commands" that were transmitted as RF signals but were not acted upon. The system may determine that a "missed command" is associated with the temperature that is sensed inside or near the ceiling fan, which may not be adequately measured by (or, may not be identical to) the temperature that is actually measured by an external sensor that measures the general room temperature. As a result, the system of the present invention may uniquely determine to offset the frequency of the wireless RF signal, in order to correct for receiver drift based on the length of time the appliance is running; thereby compensating for receiver drift that is caused, for example, by internal heating-up of the appliance that is being wirelessly and remotely commanded. These operations may be performed by an Appliance Wireless Receiver Drift Estimator 310, which may estimate or determine a frequency drift of the wireless receiver of (or within) the ceiling fan (or other controlled appliance), taking into account sensed temperature at or within or near the ceiling fan and/or sensed ambient temperature in the room (or only one of these parameters); and/or by a Transmitter Frequency Compensator/Modifier 311 which may modify the RF wireless signal of the transmitter of the cloning device based on such remotely-estimated receiver drift in order to compensate for such drift.

The present invention may provide a multi-system control of combined IR and RF devices and/or signals. For example, the system may enable autonomous and automatic conversion of an IR controlled device to become an RF controlled device; by cloning the IR control scheme, and positioning an IR transmitter with RF receiver on top of the appliance's IR receiver. The conversion device may be transparent to IR wave length, and therefore does not interfere with the operation of the conventional/proprietary IR remote control unit which would continue to be operational; while at the same time, the conversion device may allow the user to control the appliance by using an RF signal (and not only by using an IR signal), from another room, or from a location that does not have a line-of-sight between the user and the appliance's receiver. Optionally, the implementation may utilize a sticker or other mechanism; or a mechanism to affix or attach or mount the conversion device to the appliance. These features may be implemented, for example, by adhering or attaching an "IR-only to IR+RF Converter" 312 unit or adapter to (or near, or on) the IR receiver of the ceiling fan; which may allow IR signals to pass through it to the original IR receiver of the ceiling fan; and may also comprise an RF receiver to receive an incoming RF signal, and a processor to analyze the incoming RF signal, and a transmitter (e.g., an IR transmitter, or a wired transmitter) to transmit the suitable signal to the ceiling fan or to its circuitry based on the incoming wireless RF signal.

The present invention may allow voice activation of appliances that typically have only one-way radio communication capability. For example, the conversion device/cloning device of the present invention may connect to a smartphone App, and may utilize a service such as Apple's Siri or other speech recognition (SR) engine, thereby enabling translation of uttered voice or uttered speech of a user, to a command that is translated to a suitable RF signal or IR signal that in turn is transmitted wirelessly to the target appliance and commands it to modify its operation.

The present invention may further comprise a method and system for detecting whether an appliance, or its remote control unit, operate by using RF wave-length or IR wave-length. This may be achieved by one or more mechanisms, as described herein; and may be implemented, for example, by an RF-or-IF Detector unit 313.

In a first embodiment, for example, the system may utilize video camera or imager or still camera (e.g., optionally embedded within a smartphone or tablet or other device), which may detect visually the red LED in (or of) an Infra-Red remote control transmitter; and may thus classify the remote control unit (and/or the communication channel) as an Infra-Red unit and channel.

In a second embodiment, such imager or sensor may operate to actually "see" the slight light that is emitted by some remote control units that operate in the Infra-Red spectrum but may still be visible to some highly-sensitive sensors or imagers (e.g., particularly in a very dark room; for example, when the user utilizes an IR remote control unit at night-time to modify an appliance operation).

In a third embodiment, the system may measure the output power of two (or more) receivers at the same time; may compare the RF power output with the IR power output; and based on the power output determine whether an IR communication channel is used or an RF communication channel is used.

Some embodiments may utilize a cloning device or conversion device or signal reconstruction device, or receiver or transmitter or transceiver, or signal analyzer or signal recorder, which may optionally be implemented as a dedicated, stand-alone, device which may communicate with the appliance and/or with other units of the system, and may communicate with the user about various commands execution (e.g., turn on, turn off, deeming, flickering, or the like).

Some embodiments may allow the system, or a remote manufacturer of an appliance (e.g., a manufacturer of an air conditioning unit or a ceiling fan), to check remotely the battery strength level of the internal battery of an RF-based wireless remote control unit that is located at the end-user's home.

The Applicant has realized that the RF power output may be measured; and therefore, if the RF remote control unit does not seem to work, then the manufacturer or vendor or other supporting entity may remotely estimate the battery strength in order to determine whether the remote control unit is at fault, or whether the appliance (that needs to be controlled) is at fault. For example, the cloning device may measure the RF power output during the cloning process, and may store this value for subsequent comparison purposes. Subsequently, if the user complains that the RF-based remote control unit does not seem to work properly, then the cloning device may measure the actual RF output power and compare it to the pre-stored value, to determine if the internal battery of the RF-based remote control unit is weak, or depleted, or conversely if it is strong and thus the appliance is at fault. Similarly, the system and/or the cloning device may remotely detect other faults of the RF-based remote control unit, by measuring and comparing the RF frequency (e.g., to detect frequency drift); and/or to debug the RF communication channel between the RF-based remote control unit and the appliance. These operations may be performed, for example, by an RF Output Power Measurer 314, operating in conjunction with an Appliance Fault Estimator 315 and a Weak RC Battery Estimator 316.

Some embodiments of the present invention may be able to collect or obtain or download data from a remote/third-party database (e.g., FCC database), based on the remote control FCC marking—such that (in some implementations) no training/cloning would be needed in order to replicate or duplicate or generate or re-construct a suitable remote control signal that would control the appliance (e.g., ceiling fan, smart-home device or appliance, or the like).

For example, the device may be able to use a database and/or to use organic search of FCC ID, and thus acquire or obtain the central frequency. The new capability may become available since, for example, most or many transmitters use a range of 16 possible codes per device or per appliance. Some embodiments may utilize or leverage a network effect or a "wisdom of the crowd", of multiple users entering their FCC codes (e.g., at different times and locations, nationwide or worldwide) and then training/cloning their remote control units. The next time that a new user plugs in or enters or provides his FCC code to the system, no training is required, and the device (e.g., the cloning unit) of the present invention may utilize a search (e.g., binary search) to shorten the time it finds the right address. The user may indicate to the smartphone app, that the Ceiling Fan (or other appliance) was indeed controlled by the cloning unit, and such user confirmation may indicate to the cloning unit that the right code was indeed found and successfully employed.

Once the cloning device has a control word associated with FCC code, the preamble may be isolated. Additionally or alternatively, the transmitter "address" may be removed, and only the bare control word may be stored and/or utilized. This may enable the cloning unit to search through 16 different addresses (e.g., maximum 8 iterations using a binary search algorithm), and to interact with the user to identify what was the address that actually enabled to control the appliance.

For example, two ceiling fans of the same make and the same model, may have a different Device Address (e.g., a four-bit number or string, that is part of the preamble of the wireless signal, or is part of the payload of the wireless signal), and that is hard-coded or soft-coded into the ceiling fan and sets it apart from neighboring devices (e.g., to ensure that user Adam is controlling his own ceiling fan, and not the ceiling fan in his neighbor's house). Based on the make and model, the system of the present invention may determine the range of Device Addresses that characterizes such type of fan (e.g., four-bit address, which is equivalent to 16 possible address permutations); and the system may utilize an iterative process in which it attempts to control the ceiling fan by utilizing one possible address at a time and by asking the user to provide a feedback response of whether or not the ceiling fan was indeed controlled. The user's feedback allows the system to lock-in on the particular Device Address of that particular ceiling fan; and such Device Address is then inserted or pasted or injected into the preamble and/or the payload of further, other, wireless signals that are transmitted by the cloning device and are targeted to that particular fan.

In a demonstrative example: (A) The user enters the FCC code (of the proprietary/original Remote Control unit of the ceiling fan) into the smartphone app, which communicates with the cloning device; or, the user scans or captures an image of the FCC label. (B) The system (e.g., the cloning device, and/or the smartphone directly) is checking if this FCC code is recognized. (C) If it is recognized, then the cloning device checks if any user at any given time (in the past) had already recorded a remote control signal for this particular FCC code or FCC identifier; by querying a local or a remote database of already-recorded/already-analyzed wireless signals that correspond to already-entered FCC codes/identifiers. (D) If it was already recorded in the past, then the cloning device may communicate through the Smartphone App with the user, to look at the device; and it will search through the 16 states of the potential address, searching for the right address. (E) After every try (for example, maximum of 8 attempts), the cloning device asks the user if it was successful in communicating with the appliance (ceiling fan); and if so, then that address is the suitable one for that particular appliance. The above features may be implemented, for example, via a FCC-Based Address Stepping Unit 317, which may utilize a Database of Already-Analyzed FCC-Based Wireless Signals 318 storing such data and querying it (e.g., via a query unit).

In a demonstrative example, the cloning device may fetch, download, or otherwise obtain FCC-based data, based on FCC identifier and/or FCC label and/or based on make-and-model of the appliance to be controlled. The fetched data may be or may comprise, for example, a record or a string or a set of data-items, or a set of strings, such as (shown here with semi-colon separators, for demonstrative purposes): "Fan-Maker Company Ltd.; Taichung; Taiwan; KUJ9302; Sep. 20, 2004; 299.6; 299.6".

The cloning device may extract parameters from such record or set of data-items. For example, the data-item "KUJ9302" indicates the FCC identifier; in which the substring "KUJ" is an identifier of the maker (manufacturer). The two last data-items, for example, indicate the start frequency (299.6 MHz) and the end frequency (299.6 MHz), respectively, for the wireless communications of that particular appliance model. In this example, the cloning device detects that the extracted start frequency is identical to the extracted end frequency; indicating that this is Amplitude Modulation (AM), such as OOK or ASK, and eliminating FM or other types of candidate modulations. In contrast, if the end frequency is different from the start frequency, in the FCC extracted data-set, then the cloning device determines that Frequency Modulation (FM) is utilized, such as FSK (e.g., GFSK, MSK, GMSK, AFSK).

In some embodiments, once the end/start/central/carrier frequency is extracted or fetched, the frequency range may be scanned and listened-to; and there is a minimal or no risk that the signal would not be properly recorded (e.g., due to noise or due to distance of the user from the cloning device).

Additionally or alternatively, once the central frequency and the modulation type are determined, the wireless receiver of the cloning device may be further fine-tuned based on the already-known parameters, in order to further improve signal reception and recording quality.

Additionally or alternatively, extraction of the FCC identifier of the manufacturer and/or the particular model number, may allow the cloning device to rapidly query a local database (or locally-stored lookup table) and/or a remote database (e.g., a cloud-stored database, or a remote server), and to fetch from such database a full set of already-known signals or commands, or to fetch the relevant family of appliances or models that this particular appliance belongs to; and then, the cloning device may conclude the cloning process by extracting the particular address of the signal when the user clicks on the proprietary RC unit of the appliance.

Additionally or alternatively, once the family of appliance models is known, the cloning device further determines what type of payload, modulation and frequency are needed in order to operate the appliance (e.g., based on the type of device, such as ceiling fan, air conditioner, garage door opener, or the like); and once the particular address is known, the address string may be pasted or inserted into such payload that is already known for this device, and the cloning process may be concluded.

Some embodiments may comprise an On-The-Fly RF Signal Detection and Characterization Unit 319, using a Smartphone App and a server (e.g., a cloud-based server), to enable a One-click full detection process; optionally utilizing a User defined RF database.

Some embodiments of the present invention may record and demodulate unknown RF signals. The Unknown RF signal may be recorded using hardware that connect to WI-FI or Bluetooth or BLE or Thread or Zigbee or other suitable wireless communication link(s) or network(s), the recorded and/or analyzed data (of the received wireless signal, received from a proprietary RC unit) may be transmitted to a cloud-based database or other remote database.

The User is using a smartphone device in order to control the RF recording hardware. Once the data is stored in the cloud-based repository, the server or cloud agent may perform comparing of the data recorded to a large database containing other RF signals that had been recorded by other users at different times and/or locations (e.g., nationwide, worldwide).

The comparison is not a one-to-one comparison, since some elements such as address may be different between each RF signal of each different RC unit; however, the preamble and the data transmitted (the payload) may be the same across different RC units of the same model and brand of ceiling fan (or appliance). The algorithm for comparison or matching may use machine learning techniques in order to identify which parts of the signal should be regarded as payload data and as preamble, based on this large sample of wireless signals in the database.

Furthermore, the algorithm may have the ability to ignore glitches in the data. The sampling rate of the data is much higher than the data rate; and therefore some samples might show or may include a wrong value. In addition to de-glitching methods which may be used, a "big data" algorithm may be based on similarity comparison and makes the decision of which is the right demodulated pattern based on previously sampled and confirmed recorded signals that were already provided to the cloud repository by other users.

Once a determination is made to which family/vendor/FCC-related-code this wireless communication signal belongs, the system generates the rest of the functions related to this particular wireless transmitter without the need to detect them. The server agent or server-side module may reconstruct what it estimates to be the rest of the command(s) that a transmitter of this particular family or type or model or make should have (e.g., based on other users' data). This will be communicated to the smartphone or tablet App, and may allow the user to choose (e.g., accept, adopt) the calculated commands, or to continue and record manually each one of the commands for local cloning.

Some embodiments may utilize a Wrap-Around RF Recorder and Over-Writer 320 controlled by a smartphone app and RF demodulator. This function allows controlling a coded device without actually decoding the signal. For example, when recording RF signals of the proprietary RC unit of the ceiling fan, a predefine storage size is reserved for the recorded signal based on the sampling rate and the signal frequency. If the proprietary transmitter (of the proprietary RC unit of the ceiling fan) is transmitting for a long time (e.g., as determined by the user), memory can be overloaded or filled rapidly; and if the RF signal has a signature at the end of transmission (Code, or tail code, or ending code) which may be critical for the receiver (e.g., at the ceiling fan), then the recorded signal may not be able to have the desired effect on the receiver (e.g., due to memory/storage limits) unless a wrap-around scheme is used.

For example, if the RF signal recorded carrier frequency is 300 MHz with data rate of 4 KHz, and the sample rate used for recording is 48 KHz clock, then recording a transmission of 1 second may accumulate 48,000 samples, each sample represented by 8 bits, thereby consuming memory of 48 kilobytes per each such second of sampling. After the initial recording (e.g., of the first 1 or 2 or 3 or 5 or N seconds), if the RF transmitter signal is still present and active, the first bits that were recorded are overwritten, in a FIFO manner or using a cyclic buffer mechanism, until the RF signal is not present (stopped). RF signal presence may be measured or detected, for example, based on Received Signal Strength Indicator (RSSI) parameter or based on RSSI value or changes at the receiver input, or by other suitable techniques.

In some embodiments, the overwriting process that overwrites on the first bits, should be considerate on chain of zeros and cannot cut a chain of zeros short—so there is a "shift to the right" from a chain of zeros. Before the overwrite process starts, the system may determine what is the modulation chain of zero length (e.g., indicating the break between words), and may use that length requirement in detection of the chain of zeros before overwrite.

Optionally, the hardware may keep track of where in the memory the shift and overwrite started; and may use that as the reference address in memory to replay the signal. By doing so, the system may guarantee that the RF signal playback is following a First-In-First-Out (FIFO) scheme, hence the last coded word (e.g., signature) is played last. Other suitable mechanisms may be utilized, and other suitable modules or units may be used to implement the above; for example, cyclic buffer(s), wrap-around buffer(s), circular buffer(s), FIFO buffer(s), FIFO stack(s), buffer controller(s), memory mapper, or the like.

Some embodiments may comprise the ability to add a transmitter and receiver outside or inside an appliance that has only a one-way radio or has no network connectivity at all. For example, a "SmartPod" unit of the present invention may have WI-FI, ZigBee, ZWAVE, Thread, BLE connectivity; and also a one way or two way proprietary RF transmit and receive chains or modules or units that may be working on the same frequency and may have the same modulation scheme as the embedded appliance receiver. This allows any appliance to connect to a network without being manufactured or modified to have network connectivity. The "SmartPod" power may be supplied from the electric outlet, and the unit may be controlled via a smartphone/tablet App or via a Web-interface (e.g., via a Web browser).

Some embodiments may utilize a unique scheme for Power Harvesting and Power Consumption. For a battery operated cloning device (e.g., a "pico" device which may be power by internal battery; and which may be in wireless communication with a main Cloning Device that is connected to a wall power outlet), some functions can be turned off and triggered using a harvesting antenna. The hub (or the cloning device) may send a high power RF signal that will be translated to a start-up trigger or an activation trigger or a "wake up from standby mode" signal or command.

In some embodiments, the battery-operated device may need to preserve power, and will be most of the time in sleep mode or reduced-power mode or hibernation mode or stand-by mode, except when the IR signal is sent to it and/or when the RF signal is sent to it.

Some embodiments may utilize a method of designing and/or forming and/or structuring a printed Antenna on a circuit board (e.g., Passive), that may harvest specific type of RF frequency in the air and may translate or convert it to a small voltage.

In some embodiments, the cloning device, prior to sending the "real" RF signal to the battery-operated device (e.g., the "Pico" device), may firstly send or transmit an initial RF signal whose purpose may be, for example, to "wake up" the Pico device and/or to enable the Pico device to harvest power from such RF transmission (e.g., even in the order of magnitude of several nano-Ampers). In some embodiments, this may be performed only if the implementation is able to operate more effectively (e.g., from power consumption aspect) compared to just leaving the wireless receiver in the Pico device in sleep mode, continuously. This may be implemented via a High-Power RF Signal Transmitter 321 in the main (primary) cloning device; and via an RF Power Harvester unit 322 in the secondary ("pico") cloning device or unit (e.g., repeater, range extender, signal amplifier, re-broadcaster, signal relay unit, signal re-transmitter).

Some embodiments may utilize a unique and efficient interface, between what the user is doing with a remote control unit, and the cloning device hardware, and the touch-screen of the smartphone (or tablet, or other portable or handheld device). The interface may indicate to the user that the system (e.g., the cloning device, or duplicator) is able to acquire a high-quality and useful signal, in real time and/or in a short period of time, and without too many iterations of trial and error by the user.

For example, the user may click a long click on the remote control button (e.g., hold-down the button in the remote control unit), and the light on the Cloning Device may get stronger (as the user is getting closer, or if the system gets less interference), or the cloning device may otherwise indicate the progress of the acquisition or the strength of the signal (e.g., by turning-on some LED lights in a series of LED lights); and at the same time, the App on the smartphone (or tablet) may show a suitable image/light/progress bar/other indication that shows whether the signal is indeed getting stronger and/or whether the cloning device is ready to record the signal (and/or is actually or already recording the signal). The above features may be implemented, for example, using a Cloning Progress Indicator Updater 323.

In a demonstrative embodiment, for example, the Cloning Device may be plugged to an electric socket or electric receptacle located in a living room of a residence house; whereas the user would like to clone the signal of a remote control unit which controls an appliance (e.g., a ceiling fan) that is located in a bedroom of that house. The user may carry or bring the remote control unit, from the bedroom to the living room, in order to enable or facilitate the signal cloning; but then the user may not be able to directly observe the response of the bedroom appliance to the cloned signal of the cloning device. Accordingly, the system's interface may resolve such situations, by providing to the user continuous feedback with regard to the cloning process. It is noted that the cloning, duplication, recording and/or analysis of the wireless signal of the proprietary RC unit of the ceiling fan, may require the user to operate the proprietary RC unit of the ceiling fan in proximity to the cloning unit (e.g., in the same room of the cloning unit), but does not require that the ceiling fan itself would be located in the same room (or in the same venue).

Some embodiments may utilize or may provide a unique combination of sound and RF alarm. Some Fire alarms and other safety devices (e.g., smoke detector, fire detector, CO detector, Radon detector), in addition to emitting alarm sounds, may also transmit an RF signal with information about the type of alarm or hazard that was detected. The present invention may use both sound detector and RF demodulator to determine if there is a safety hazard inside of a home or office or other venue. When a decision about the occurrence of the alarm is made, a message may be sent to a predefined smartphone or tablet or other device or other pre-defined destination or recipient.

Some embodiments may utilize a method for code breaking (or cloning signals, or duplicating signals, or re-constructing signals, or reverse engineering signals) of a proprietary RC unit of an appliance or an RC-controlled system, using a sufficiently-large data sample. Instead of trying to break a rolling code by observing changing signals form the same transmitter over time, some embodiments may use a large database that includes demodulated signals from a large base of users using the same type of wireless transmitters. In this case the system does not have to guess or calculate the next rolling code; and instead may generate a code that was working for another user using the same type of transmitter or the same type (e.g., make and model) of RC unit or appliance.

In some embodiments, a spectrum survey module, or a Baseline Exploration Spectrum Scanner 324 may perform spectrum scanning of the venue, prior to requesting the user to click any buttons on the proprietary RC unit of the ceiling fan (or other appliance); in order to characterize the home environment or other venue environment with regard to already-active or already-existing electromagnetic waves (e.g., RF waves of a Wi-Fi router, RF signals of a Smart Television or a Bluetooth device, cellular signals of smartphones, RF signals, RF audio, IR signals, microwave signals from microwave oven, existing or persistent interference or noises, or the like). Once the exploration process is completed, the RF Audio and IR base-line noise(s) of the specific house or venue are stored locally in the cloning device and/or remotely in a user profile (e.g., on a remote server or "cloud computing" repository), thereby facilitating further acquisition and cloning of RC units, and enabling the cloning device to discard or dis-regard or to filter-out such already-existing RF signals or noises, and to avoid a determination that such other already-existing signal(s) are incorrectly attributed to the RC unit intended for cloning. Optionally, the Baseline Exploration Spectrum Scanner 324 may re-scan and update such information, particularly when the cloning unit is idle (e.g., not performing a signal cloning process; and also, not transmitting a cloned signal). Once the cloning device is subsequently triggered to scan for a new remote RC unit for cloning (e.g., mainly RF), or to adjust to a new audio sound, then the cloning device may skip the RF frequency of the already-known undesired noises or signal(s), or may filter the undesired audio, or may otherwise take into account such already-known baseline signals and baseline noise in the venue.

In some embodiments, a Provisioning-Based RF Matching Unit 325 may be used. For example, a remote server may collect data on already-known or already-analyzed RC units of various appliances, thereby saving the user time and effort in performing a manual cloning process. The particular RF transmitter of a particular proprietary RC unit, may have a different address; and the server may dynamically parse or paste this data-item into an already-known payload structure. The Provisioning-Based RF Matching Unit 325 may operate to track a particular type of proprietary RC unit that is being recorded and cloned by multiple different users; in such "provisioning" or "staging" phase, additional recordings are uploaded to the remote server from multiple cloning devices, having different addresses but also having similar payloads and/or similar payload structure; and by collecting more and more of these additional recordings, the server may determine which bits of the packet(s) belong to the address and which bits of the packet(s) to the actual payload; thereby allowing the server to autonomously define a new family of RC units that share the same payload (except for the unique address of each RC unit), and thereby enabling the server and the cloning device to perform a shortened and faster cloning process in which the user needs only to provide feedback to a series of automatic attempts that iterate through a set of addresses.

In some embodiments, the server may ask the user questions in order to narrow-down into a particular sub-family or batch or series of devices; for example, a set of similar Ceiling Fans from the same manufacturers, may be called Model 1503 and Model 1504; and their main (or only) difference may be, for example, that Model 1503 has three speeds of spinning the blades, whereas Model 1504 has four such speeds; such that, for example, their RC units have the same RF payload except for one RC unit having an additional command ("speed level 4"), or that they differ by another small subset of data (e.g., "speed level 3" in one model, corresponds to "speed level 4" in the other model). In such case, the detection process includes the server but also utilizes an interface to the user in which the user is asked one or several questions to allow pinpointing of the particular model (e.g., "does your original RC unit have three speed levels or four speed levels?". Optionally, the system may autonomously analyze the already-programmed features or already-cloned commands, in order to further pinpoint on the precise model number of the appliance; for example, if the user has already programmed (cloned) four speed levels, then the system may already determine that this is for Model 1504, and may skip the manual cloning process of "turn on" command and "turn off" command for that Model 1504 which may already be known to the system. Accordingly, a dynamically-changing cloning process may utilize machine learning and/or pre-defined criteria, to deduce additional data about the Make and/or Mode of the appliance, based on already-provided answers from the user, and/or based on already-determined features of the appliance.

Some embodiments of the present invention may comprise, for example: a light-bulb or illumination unit having therein, or attached thereto, an RF transmitter and/or an RF receiver; in order to receive an incoming RF signal (e.g., from a smartphone), and/or to transmit an RF signal to the cloning device and/or to the appliance being controlled (e.g., a ceiling fan); and optionally, such light-bulb or illumination unit may be connected through a wired link (e.g., conductive cable or wire or hard-wire) to a control box or controller of the appliance (e.g., ceiling fan) and may thus receive an incoming RF signal and transfer a wired signal to the nearby controller of the appliance (e.g., ceiling fan). This may allow a user to easily upgrade a conventional ceiling fan, which may not have RF reception capabilities, into an RF-connected or RF-receiving ceiling fan (or other device).

In some embodiments, optionally, the RF receiver and/or RF transmitter need not be inside the light-bulb, but rather may be mounted on (or attached to, or connected to, or added to) a base or socket or female-member, into which such light-bulb is inserted or is threaded or attached; and optionally, a wired link may then transfer a wired signal to the controller of such ceiling fan or other appliance.

Some embodiments may implement a novel Virtual Dimmer Module 326, or a "Dimmer from the Cloud" function, which enables a user to utilize a smartphone or tablet in order to dim, or to modify a dimmer setting, of a light fixture or other light bulb (e.g., a light bulb or an illumination unit of a Ceiling Fan). For example, a ceiling fan may have an integrated light bulb, and a wall-mounted dimmer rotation dial that should be manually rotated in order to dim-up or dim-down the level of light. The cloning device may be able to clone and to transmit wireless signals to the ceiling fan, commanding the ceiling fan to dim-up or dim-down the level of light; however, the cloning device may not necessarily receive feedback from the ceiling fan, since a conventional ceiling fan may not necessarily have any transmission capability, and may be a receiver-only appliance. Additionally, the cloning device does not physically rotate the wall-mounted dimmer dial. In order to solve these obstacles, the Virtual Dimmer Module 326 may continue to send a "dim-down by one increment" command, repeatedly, as long as the user keeps holding-down/touching an on-screen dimmer-down interface; and similarly, the Virtual Dimmer Module 326 may continue to send a "dim-up by one increment" command, repeatedly, as long as the user keeps holding-down/touching an on-screen dimmer-up interface. Instead of receiving RF feedback from the ceiling fan, the feedback loop is closed by the fact that the user stopped holding-down (or touching) the on-screen dimmer emulator, thereby indicating to the cloning device that the target dimming level has been reached at the ceiling fan's light bulb.

In some embodiments, the cloning device may generate and may utilize a playback of raw wireless signal "as recorded", even if such recorded signal is partially corrupted or comprises some incorrect data therein, since even such partially-correct recorded signal may be sufficiently useful in order to command the ceiling fan (or other appliance). Optionally, an error-free, clean, uncorrupted signal may be generated from scratch by the cloning device, for example, based on FCC based identification of the RC unit, and/or based on user feedback that enables the system to pinpoint the particular make and model of the appliance being controlled.

Some embodiments may perform and/or may utilize detection of data rate in OOK and/or ASK modulation, via a Data-Rate Detector/Decimation Unit 327. For example, the server may obtain the digital data of the acquired signal (being cloned) after the wireless receiver of the cloning device (and the associated circuitry, filters, amplifiers, noise reducers, demodulator) had operated and performed signal demodulation. Due to the utilization (e.g., by the wireless receiver of the cloning device) of RSSI-based values as a threshold for signal detection, the length of the "0" bit and/or the "1" bit may vary, and may not be constant across different RC units being cloned. Additionally or alternatively, some modulation schemes (e.g., OOK or ASK), without a special code or encoding scheme (e.g., Manchester coding, or Phase Encoding (PE) scheme) may not necessarily include therein clock recovery information. The system of the present invention (e.g., the cloning device, or the remote server) may determine autonomously the length of the average "0" that is within the expected data rate, and the length of the average "1", and may then use this information in the decimation of the RF payload or in division of the RF payload into discrete data-items. Such decimation may be important; for example, if the wireless receiver of the cloning device produces a payload with consistently shorter "0" and consistently longer "1", absent the correct decimation the cloning unit may incorrectly determine whether 30 clocks of "0" represent five zero or six zeros, or the like.

Some embodiments may utilize a staging process, performed remotely in a remote server or at a "cloud computing" unit, when a wireless signal of an unknown remote control unit is being recorded locally. For example, the local device may upload the recorded signal to the remote server; which in turn may wait for other users to record (and upload) signals of the same remote control unit (in other venues and locations). The server may autonomously determine and/or detect, based on matching and/or signal analysis, which parts of the uploaded signal(s) are preamble, or the Address, or the Payload, or a rolling code (or other properties that are common to the uploaded signals). Once the remote server determines that it has sufficient matches or sufficient information, the server may define this type of remote control units as a "new family" of remote control units, which then allows a subsequent user to avoid recording all (or some) wireless control functions of such remote control unit from such determined family.

Some embodiments, may utilize a "soft" decision process, or a sufficiently-close decision process, or a fuzzy-logic decision process. For example, since RF recording may sometimes have errors, a remote server may utilize a confidence estimator, and may search all the known payloads of relevant signals, searching for a match with a currently-recorded or currently-uploaded signal. If the server finds a payload that is at least K percent identical (e.g., K being 85 or 90 or 95, or other suitable value) relative to the recorded and uploaded signal, then the server may offer to the user a set or an entire dashboard of wireless controls for that "sufficiently close" candidate ceiling fan; the user may attempt to operate the ceiling fan based on signals that are generated locally based on the candidate data received from the serve; and if the proposed wireless signals indeed operate the user's ceiling fan, then the system prevents a situation in which the user needs to record every relevant wireless command just because the local recording was "close" to a candidate already-known signal, but not exactly identical to it.

Some embodiments may comprise, for example: a system as described herein; a method as described herein; a sensor as described herein; a cloning device or duplicator unit as described herein; a remote control unit; an application for a smartphone/tablet/portable device, as described herein; an appliance comprising one or more of the units described herein; an air conditioning device comprising one or more of the units described herein; a ceiling fan comprising one or more of the units described herein; a kit for converting a one-way communication appliance, into a smart RF-connected or Internet-connected appliance; a kit for converting a one-way communication air conditioning device, into a smart RF-connected or Internet-connected air conditioning device; a kit for converting a one-way communication ceiling fan, into a smart RF-connected or Internet-connected ceiling fan; a light bulb having an integrated wireless receiver and/or an integrated wireless transmitter and/or an integrated wired transmitter, to upgrade a conventional ceiling fan (or a light-fixture) into an RF-controlled device.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

In some embodiments, a device comprises: a wireless signal cloning unit, to enable a portable electronic device to wirelessly control a ceiling fan that is not necessarily in a line-of-sight of the portable electronic device; wherein the wireless signal cloning unit comprises: a first wireless receiver to receive a first wireless communication signal that is transmitted by a proprietary remote control unit of said ceiling fan; a signal analysis unit to analyze a payload and a carrier frequency of the first wireless communication signal; a signal reconstruction unit to reconstruct a second wireless communication signal, having reconstructed payload and reconstructed carrier frequency that are at least compatible with the payload and the carrier frequency of the second wireless communication signal; a second wireless receiver to wirelessly receive, from said portable electronic device, a wireless communication signal indicating a user-selected command that a user of the portable electronic device wishes to be wirelessly transmitted to said ceiling fan; a wireless transmitter to transmit to said ceiling fan, said second wireless communication signal, in response to said wireless communication signal that is wirelessly received from said portable electronic device.

In some embodiments, the signal analysis unit comprises a payload and carrier frequency recorder unit, to record (i) an entirety of the payload and (ii) an entirety of the carrier frequency of the first wireless communication signal, and to store in a storage unit of the wireless signal cloning unit digital data corresponding to said entirety of the payload and to said entirety of the carrier frequency; wherein the signal reconstruction unit and the wireless transmitter comprise: a payload-and-carrier playback unit, to wirelessly transmit to said ceiling fan a playback of said first wireless communication signal based on said digital data that corresponds to said entirety of the payload and to said entirety of the carrier frequency.

In some embodiments, the signal analysis unit comprises a payload and carrier frequency recorder unit, to record (i) an entirety of the payload of the first wireless communication signal and (ii) a non-entire partial portion of the carrier frequency of the first wireless communication signal; and to store in a storage unit of the wireless signal cloning unit digital data corresponding to said entirety of said (I) entirety of the payload of the first wireless communication signal and (II) said non-entire partial portion of the carrier frequency of the first wireless communication signal; wherein the signal reconstruction unit and the wireless transmitter comprise: a payload-and-carrier playback unit, to wirelessly transmit to said ceiling fan a playback of said first wireless communication signal based on said digital data that corresponds to said entirety of said (I) entirety of the payload of the first wireless communication signal and (II) said non-entire partial portion of the carrier frequency of the first wireless communication signal.

In some embodiments, the signal analysis unit comprises: an imager to capture an image of at least a portion of said proprietary remote control unit; an image analysis unit to extract from said image, a Federal Communications Commission (FCC) identifier of said proprietary remote control unit; a data fetching unit to obtain from a database, a record indicating properties of said first wireless communication signal, based on a query that utilizes at least said FCC identifier that was extracted from said image; wherein the signal reconstruction unit is to reconstruct said second wireless communication signal based on said properties of the first wireless communication signal as obtained from said database based on said query.

In some embodiments, the device comprises: a remote wireless receiver drift estimator, to remotely estimate a frequency drift of a wireless communication receiver of said ceiling fan; a transmitter frequency compensator to modify one or more properties of the second wireless communication signal to compensate for estimated frequency drift of said wireless communication receiver of said ceiling fan.

In some embodiments, the device comprises: an Infra-Red-only to Infra-Red-and-Radio-Frequency converter, configured to be mounted onto said ceiling fan, (i) to allow passage of an incoming IR signal via said converter, and (ii) to receive a wireless RF signal and to convert it to a non-RF signal that is transferred to the ceiling fan to control the ceiling fan.

In some embodiments, the device comprises: an RF output power measurer, to measure and to track changes in RF output power of the proprietary remote control unit; an appliance fault estimator, to determine that said ceiling fan is not operating properly, based on analysis of the RF output power of the proprietary remote control unit.

In some embodiments, the device comprises: an FCC-based Address Stepping Unit, to perform gradual stepping through a pre-defined number of candidate addresses that are related to a central frequency that is obtained from analysis of an FCC identifier of said proprietary remote control unit of the ceiling fan; wherein the second wireless communication signal is constructed based on feedback from the user, indicating whether or not utilization of a candidate address achieves proper commanding of the ceiling fan via the portable electronic device.

In some embodiments, the signal analysis unit comprises: a user interface to receive from a user an indication of a particular Federal Communications Commission (FCC) identifier of said proprietary remote control unit; and a query module to query a database of already-analyzed FCC-based wireless signals of proprietary remote controls of ceiling fans, and to fetch from said database a set of characteristics of wireless signals that are utilized by a particular remote control unit that corresponds to said particular FCC identifier entered by said user; wherein the signal reconstruction unit is to reconstruct said second wireless communication signal based on said characteristics of wireless signals that are utilized by said particular remote control unit that corresponds to said particular FCC identifier entered by said user.

In some embodiments, the signal analysis unit is to download from a remote database, a set of characteristics of wireless signals that are utilized by a particular remote control unit that corresponds to a particular FCC identifier that is entered by said user for said proprietary remote control unit of said ceiling fan; wherein the signal reconstruction unit is to reconstruct said second wireless communication signal based on said characteristics of wireless signals that are downloaded from said remote database and that correspond to said proprietary remote control unit.

In some embodiments, the device comprises: a wrap-around Radio Frequency (RF) recorder and over-writer unit, to record the payload and the carrier frequency of the first wireless communication signal; to store in a FIFO buffer data corresponding to recorded information; to over-write data in said FIFO buffer as long as existence of RF signal is detected; to stop over-writing data in said FIFO buffer upon determination that the RF signal ceased; and to thereby ensure that a tailing code of said RF signal is written in said FIFO buffer and is not over-written upon.

In some embodiments, the device comprises: a high-power RF signal transmitter, to transmit a high-power RF signal intended for reception by a standby-mode wireless receiver of a secondary cloning device; wherein said high-power RF signal, upon reception by said secondary cloning device, enables an RF power harvester unit of said secondary cloning device to harvest from said high-power RF signal electromagnetic energy that is sufficient for switching one or more other components of said secondary cloning device from a turned-off mode to a turned-on mode.

In some embodiments, the device comprises: a real time cloning progress indicator updater, to track a progress of a signal cloning process in which a wireless signal of a proprietary remote control unit of a ceiling fan is being cloned while the proprietary remote control unit is located in a same room with said cloning device and while the ceiling fan is located in a different room; and to generate and to convey to the user an indication of said progress of said signal cloning process.

In some embodiments, the device comprises: a baseline exploration spectrum scanner, (i) to perform a pre-cloning baseline scan of an electromagnetic spectrum in a venue in which the ceiling fan is located, prior to commencing a signal cloning process in which the proprietary remote control unit of the ceiling fan transmits any signals, and (ii) to determine a baseline of non-fan signals and ambient noises that exist in said venue prior to commencement of said signal cloning process; wherein the signal analysis unit is to analyze the first wireless communication signal using a signal analysis technique that skips or filters-out said non-fan signals and ambient noises that were detected during said pre-cloning baseline scan.

In some embodiments, the device comprises: an image analysis module, (a) to receive one or more images of said ceiling fan; (b) to perform on said one or more images at least one of: (I) computer vision algorithm, (II) image comparison process, (III) search-by-image process; (c) based on step (b), to determine a make and a model of the ceiling fan; (d) based on step (c), to obtain data corresponding to one or more characteristics of a wireless signal that can control said ceiling fan, wherein said data comprises at least one feature that is used to reconstruct a compatible signal capable of remotely controlling said ceiling fan.

In some embodiments, the device comprises: an image analysis module, (a) to receive one or more images of the proprietary remote control unit of said ceiling fan; (b) to perform on said one or more images at least one of: (I) computer vision algorithm, (II) image comparison process, (III) search-by-image process; (c) based on step (b), to determine a make and a model of the ceiling fan; (d) based on step (c), to obtain data corresponding to one or more characteristics of a wireless signal that can control said ceiling fan, wherein said data comprises at least one feature that is used to reconstruct a compatible signal capable of remotely controlling said ceiling fan.

In some embodiments, the device comprises: a virtual light-dimmer module, (a) to receive from said portable electronic device one or more signals indicating that said user is continuously pressing an on-screen dimmer interface element; (b) to wirelessly transmit to said ceiling fan, as long as said user keeps pressing said on-screen dimmer interface element, wireless commands do perform incremental light-dimming operations; (c) to cease transmitting to said ceiling fan further wireless commands of incremental light-dimming operations once said user ceases to press said on-screen dimmer interface.

In some embodiments, the device comprises: a data-rate detector and decimation unit, (a) to determine a data-rate of wireless transmission of said proprietary remote control unit that lacks clock recovery information, and (b) to determine an average length of transmission of a Zero value by said proprietary remote control unit, and (c) to determine an average length of transmission of a One value by said proprietary remote control unit, and (d) to autonomously perform decimation of captured data payload transmitted by said proprietary remote control unit that lacks clock recovery information.

In some embodiments, the device comprises: a transmitter to upload to a remote server, data representing at least a partial recording of the first wireless communication signal that is captured by the wireless receiver of said device; wherein the wireless receiver of said device is to receive from said remote server, an indication that said remote server is currently able to provide to said device a set of wireless signal properties for replicating in said device the first wireless communication signal, wherein said indication is based on an analysis of said remote server of multiple wireless signals uploaded to said remote server by multiple, different, devices that said remote server determined to belong to a same model of ceiling fan, and from which said remote server is able to extract at least one of: payload data, rolling code, address, preamble properties.

In some embodiments, wherein the signal analysis unit is configured (a) to determine that a non-exact match exists, beyond a pre-defined threshold level of similarity, between (I) the first wireless communication signal that is captured by the wireless receiver of said device, and (II) an already-known candidate wireless signal that is known to control a candidate ceiling fan; (b) to obtain from a remote server, data that describes a set of wireless signals that correspond to wireless commands that are able to wirelessly control said candidate ceiling fan; (c) to generate said second wireless communication signal, that controls said ceiling fan, by using said data that describes said set of wireless signals that controls said candidate ceiling fan.

The present invention includes devices, systems, and methods of wirelessly controlling appliances and electronic devices, such as ceiling fans, air conditioners, garage doors, or the like. For example, a receive-only ceiling fan is wirelessly controlled by a proprietary remote control unit. A cloning unit is able to clone or duplicate the proprietary wireless signal, and to replay it or re-generate it in response to a triggering command that a user submitted via a smartphone or tablet; thereby enabling to control such appliances via mobile electronic devices. The cloning unit utilizes recording of the wireless signal payload and carrier frequency; wireless signal analysis; image analysis of the appliance or of the remote control unit; queries to a remote server to obtain properties of the proprietary wireless signal; or other techniques of signal analysis or duplication.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A device comprising:
a wireless signal cloning unit, to enable a portable electronic device to wirelessly control a ceiling fan that is not necessarily in a line-of-sight of the portable electronic device;
wherein the wireless signal cloning unit comprises:
a first wireless receiver to receive a first wireless communication signal that is transmitted by a proprietary remote control unit of said ceiling fan;
a signal analysis unit to analyze a payload and a carrier frequency of the first wireless communication signal;
a signal reconstruction unit to reconstruct a second wireless communication signal, having reconstructed payload and reconstructed carrier frequency that are at least compatible with the payload and the carrier frequency of the second wireless communication signal;
a second wireless receiver to wirelessly receive, from said portable electronic device, a wireless communication signal indicating a user-selected command that a user of the portable electronic device wishes to be wirelessly transmitted to said ceiling fan;
a wireless transmitter to transmit to said ceiling fan, said second wireless communication signal, in response to said wireless communication signal that is wirelessly received from said portable electronic device;
wherein the signal analysis unit comprises: an imager to capture an image of at least a portion of said proprietary remote control unit; an image analysis unit to extract from said image, a Federal Communications Commission (FCC) identifier of said proprietary remote control unit; a data fetching unit to obtain from a database, a record indicating properties of said first wireless communication signal, based on a query that utilizes at least said FCC identifier that was extracted from said image;
wherein the signal reconstruction unit is to reconstruct said second wireless communication signal based on said properties of the first wireless communication signal as obtained from said database based on said query.

2. A device comprising:
a wireless signal cloning unit, to enable a portable electronic device to wirelessly control a ceiling fan that is not necessarily in a line-of-sight of the portable electronic device;
wherein the wireless signal cloning unit comprises:
a first wireless receiver to receive a first wireless communication signal that is transmitted by a proprietary remote control unit of said ceiling fan;
a signal analysis unit to analyze a payload and a carrier frequency of the first wireless communication signal;
a signal reconstruction unit to reconstruct a second wireless communication signal, having reconstructed payload and reconstructed carrier frequency that are at least compatible with the payload and the carrier frequency of the second wireless communication signal;
a second wireless receiver to wirelessly receive, from said portable electronic device, a wireless communication signal indicating a user-selected command that a user of the portable electronic device wishes to be wirelessly transmitted to said ceiling fan;
a wireless transmitter to transmit to said ceiling fan, said second wireless communication signal, in response to said wireless communication signal that is wirelessly received from said portable electronic device;
wherein the signal analysis unit comprises: a user interface to receive from a user an indication of a particular Federal Communications Commission (FCC) identifier of said proprietary remote control unit; and a query module to query a database of already-analyzed FCC-based wireless signals of proprietary remote controls of ceiling fans, and to fetch from said database a set of characteristics of wireless signals that are utilized by a particular remote control unit that corresponds to said particular FCC identifier entered by said user;
wherein the signal reconstruction unit is to reconstruct said second wireless communication signal based on said characteristics of wireless signals that are utilized by said particular remote control unit that corresponds to said particular FCC identifier entered by said user.

3. A device comprising:
a wireless signal cloning unit, to enable a portable electronic device to wirelessly control a ceiling fan that is not necessarily in a line-of-sight of the portable electronic device;

wherein the wireless signal cloning unit comprises:
a first wireless receiver to receive a first wireless communication signal that is transmitted by a proprietary remote control unit of said ceiling fan;
a signal analysis unit to analyze a payload and a carrier frequency of the first wireless communication signal;
a signal reconstruction unit to reconstruct a second wireless communication signal, having reconstructed payload and reconstructed carrier frequency that are at least compatible with the payload and the carrier frequency of the second wireless communication signal;
a second wireless receiver to wirelessly receive, from said portable electronic device, a wireless communication signal indicating a user-selected command that a user of the portable electronic device wishes to be wirelessly transmitted to said ceiling fan;
a wireless transmitter to transmit to said ceiling fan, said second wireless communication signal, in response to said wireless communication signal that is wirelessly received from said portable electronic device;
wherein the signal analysis unit is to download from a remote database, a set of characteristics of wireless signals that are utilized by a particular remote control unit that corresponds to a particular FCC identifier that is entered by said user for said proprietary remote control unit of said ceiling fan;
wherein the signal reconstruction unit is to reconstruct said second wireless communication signal based on said characteristics of wireless signals that are downloaded from said remote database and that correspond to said proprietary remote control unit.

* * * * *